United States Patent [19]

Off et al.

[11] 4,328,062

[45] May 4, 1982

[54] APPARATUS FOR DEPOSITING ADHESIVE STRIPS

[75] Inventors: Joseph W. A. Off, Irving; Judson H. Early, Dallas; William B. Greer, Grand Prairie, all of Tex.

[73] Assignee: Haggar Company, Dallas, Tex.

[21] Appl. No.: 88,558

[22] Filed: Oct. 29, 1979

Related U.S. Application Data

[62] Division of Ser. No. 845,450, Oct. 25, 1977, Pat. No. 4,214,933.

[51] Int. Cl.³ .................... B26D 5/26; B30B 15/34; B32B 31/00
[52] U.S. Cl. .................................. 156/353; 156/361; 156/378; 156/497; 156/518; 156/519; 156/521; 156/530; 156/541; 156/583.1; 156/584
[58] Field of Search ............... 156/518, 520, 530, 540, 156/541, 584, 261, 361, 353, 378, 583.1, 517, 519, 521, 249, 497

[56] References Cited

U.S. PATENT DOCUMENTS

| | | | |
|---|---|---|---|
| 2,033,553 | 3/1936 | Scholl | 156/518 |
| 2,523,389 | 9/1950 | Oskow | 156/530 |
| 2,865,261 | 12/1958 | Seragnoli | 156/520 |
| 3,530,028 | 9/1970 | Messmer | 156/584 |
| 3,625,799 | 12/1971 | Way | 156/530 |
| 3,912,570 | 10/1975 | Schweisfurth | 156/378 |
| 3,992,244 | 11/1976 | Craig et al. | 156/541 |
| 3,993,526 | 11/1976 | Off et al. | 156/267 |

Primary Examiner—Michael G. Wityshyn
Attorney, Agent, or Firm—Richards, Harris & Medlock

[57] ABSTRACT

In an apparatus for and method of depositing adhesive strips, a ribbon including a layer of adhesive is directed along a predetermined input path. In the first two embodiments, the ribbon is engaged between a measuring roller and a driven roller responsive thereto, and fed into positioning structure. The material on which the adhesive is to be deposited is located between the positioning structure and a head, which can be heated. Separation means is provided adjacent the input path for selectively separating at least a portion of the ribbon to form adhesive strips, after which the strip of adhesive, the material and the head are engaged to effect deposition of the activated adhesive strip onto the material. In a third embodiment, the ribbon is engaged by a feed pulley and directed toward a revolving wheel rotatably interconnected with the feed pulley. The wheel, which can be heated, receives and transports the ribbon along a portion of the periphery thereof to press the activated adhesive into engagement with the adjacent material. Both the feed pulley and the wheel are mounted on a frame which is rotatably supported so that strips of adhesive can be applied in linear or curvilinear fashion. If desired, separation means can be provided between the feed pulley and the wheel for selectively separating at least a portion of the ribbon to form adhesive strips of predetermined lengths.

12 Claims, 8 Drawing Figures

APPARATUS FOR DEPOSITING ADHESIVE STRIPS

This is a division of application Ser. No. 845,450 filed Oct. 25, 1977, now U.S. Pat. No. 4,214,933.

BACKGROUND AND SUMMARY OF THE INVENTION

This invention relates to an apparatus for and method of depositing adhesives, and more particularly to an apparatus capable of the precise deposition of adhesive strips on a length or piece of material, such as metal, plastic or fabric.

In particular, the manufacture of garments from fabric materials has traditionally involved numerous sewing procedures. These sewing procedures were formerly carried out manually by individual tailors wielding needles and thread. The advent of the sewing machine signaled a vast improvement in the art, however, extensive human interaction is still necessary in virtually every phase of garment fabrication since sewing procedures are not readily adaptable to automation. In particular, numerous manual operations are required in the fabrication of components for a garment. For example, the construction of pockets alone involves many time-consuming manual operations which tend to boost the manufacturing cost for the entire garment. In an attempt to eliminate these time-consuming and costly manual operations, there recently has been some interest in the use of adhesive connection techniques as a replacement for stitched seams. However, the proficient utilization of adhesive materials in garment fabrication requires an accurate means for positioning adhesive material at a predetermined location on fabric material which has not heretofore been available, other than manually.

The present invention comprises an apparatus for depositing adhesives which overcomes the foregoing and other problems long since associated with the prior art. In accordance with the broader aspects of the invention, a ribbon of adhesive is directed along a predetermined path adjacent to a length or piece of material for deposition. The adhesive ribbon can comprise a substance responsive to heat, radiation, pressure, or ultrasonic vibration. A precise length of adhesive formed from the ribbon is metered into proximity with the material before activation and engagement to attach the strip of adhesive thereto. Consequently, utilization of the invention permits predetermined strips of adhesive to be attached at precise locations to a length or piece of material prior to subsequent fabrication operations. The apparatus functions on an automatic basis, thus eliminating many heretofore required manual trimming and positioning operations associated with the use of adhesives in various operations. While the invention is particularly suited to the deposition of adhesives onto fabric, it will be understood that the invention can be utilized with metals, plastics or other materials.

In accordance with more specific aspects of the invention, a ribbon of adhesive is drawn from a roll of ribbon. The adhesive ribbon may include a backing on one side of the adhesive. In a first embodiment of the invention, adhesive ribbon with a backing on one side thereof is engaged between measuring and feed rollers and directed into positioning structure. Prior to entering the positioning structure, separation means responsive to the measuring roller traverses and separates the adhesive layer of the ribbon from the backing to provide an adhesive strip of preselected length. Subsequent rollers draw the adhesive ribbon into positioning structure located adjacent a length or piece of material on which the adhesive is to be deposited. With the strip of adhesive disposed between the backing and the length of material, a movable head is actuated to press the material and the adhesive strip into engagement with the positioning structure, thereby securing the adhesive strip to the adjacent material. The head itself can be heated or ultrasonically vibrated to activate the adhesive, or an outside source of radiation or heat could be used, if desired. The deposited adhesive strip is disconnected from the backing strip, by which the next strip of adhesive is drawn into the positioning structure.

In a second embodiment of the invention, measuring and feed rollers engage and advance the adhesive ribbon between fixed and movable blades into positioning structure adjacent a length or piece of material. The presence of a backing on one side of the adhesive ribbon is not required for the operation of this embodiment. After positioning of the adhesive ribbon, a movable portion of the positioning structure extends to simultaneously shear the ribbon and to press the material and sheared strip of adhesive into engagement with a stationary head. If desired, the material can then be advanced around a series of rollers to remove any backing from the attached adhesive strip. In both of the first embodiments, the material can be advanced through the apparatus at any desired orientation relative thereto. Thus, the first two embodiments of the invention function to deposit substantially straight strips of adhesive at precise locations on a piece of material.

In a third embodiment of the invention, an apparatus for depositing strips of adhesive is mounted on steerable post structure. The incoming adhesive ribbon is engaged by a feed and metering pulley which is rotatably mounted in the post structure. The adhesive ribbon is directed toward a revolving wheel which is drivingly interconnected with the feed pulley. Means are provided for precision stopping and starting of the adhesive ribbon in the apparatus, if desired. Preferably, separation means responsive to the feed pulley are provided to separate the adhesive ribbon into strips of preselected length. The revolving wheel includes a circumferential recess for receiving and guiding the adhesive strip into engagement with the underlying material. The adhesive strip is activated as it is guided into engagement. The wheel itself can be heated or ultrasonically vibrated to activate the adhesive, or an outside source of radiation or heat can be used, if desired. In the third embodiment, the apparatus can be steered relative to the adjacent material, which affords directional capability whereby relatively longer adhesive strips can be precisely deposited in linear or curvilinear fashion.

DESCRIPTION OF THE DRAWINGS

A more complete understanding of the invention may be had by reference to the following Detailed Description when taken in conjunction with the accompanying Drawings, wherein.

DETAILED DESCRIPTION

Figure 1:
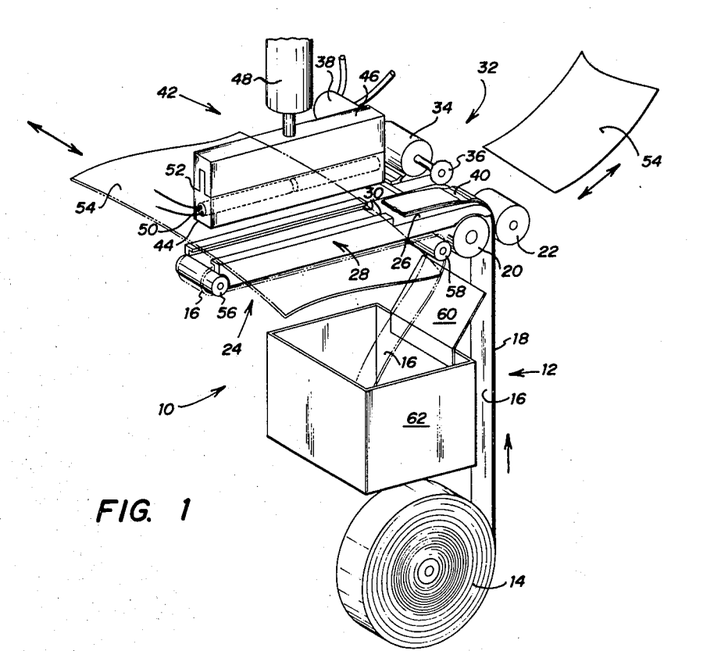
FIG. 1 is a diagrammatic illustration of an apparatus for depositing adhesives incorporating a first embodiment of the invention in which certain parts have been broken away to illustrate more clearly certain features of the invention.

Referring now to the Drawings wherein like reference characters designate like or corresponding parts throughout the several views, and particularly to FIG. 1 thereof, there is shown an apparatus for depositing adhesives 10 incorporating a first embodiment of the invention. The apparatus 10 can be utilized to deposit adhesive onto rigid, semi-rigid or flexible materials including metal, plastic or fabric. The apparatus 10 is particularly useful in the precise deposition of adhesives on lengths or pieces of flexible material, such as fabric, prior to subsequent fabrication operations. In the practice of the invention, an adhesive ribbon 12 is fed into the apparatus 10 from a supply reel 14. Ribbon 12 comprises a backing 16 coated on one side with a layer of adhesive 18. Backing 16 of ribbon 12 is preferably at least as wide as adhesive 18. Ribbon 12 may be of the type produced by General Fabric Fusing Co. of Cincinnati, Ohio, in which the backing 16 is formed of paper, and the adhesive layer 18 comprises nylon, polyamide or polyester substance. If desired, pressure sensitive ribbon could also be used in the practice of the invention.

The incoming ribbon 12 is frictionally engaged between driven roller 20 and idler roller 22. Preferably, rollers 20 and 22 are coated with a skid-resistant substance, such as rubber, so that no slippage occurs during advancement of ribbon 12. Roller 22 is connected to a transducer (not shown) by which precise measurement can be made of the length of ribbon 12 advanced thereby. Roller 22 thus performs a measuring function. Drive roller 20 is responsive to measuring roller 22 to intermittently advance ribbon 12.

Rollers 20 and 22 direct ribbon 12 into engagement with positioning structure 24. Positioning structure 24 includes flat surface 26 which serves to support ribbon 12 during advancement. In this regard, it is pointed out that ribbon 12 is fed into apparatus 10 so that the side having backing 16 thereon will be positioned against surface 26. Positioning structure 24 includes guide portion 28 located along the transportation path of ribbon 12. Guide portion 28 can comprise any suitable configuration, such as opposed grooves 30, or opposed fence sections (not shown).

Cutting assembly 32 positioned adjacent surface 26 functions to separate adhesive 18 of ribbon 12 into strips of adhesive 18. Cutting assembly 32 comprises an electric motor 34 driving a small milling cutter 36. Motor 34 is mounted for movement toward and away from the path of ribbon 12, and is actuated by double acting cylinder 38. Cylinder 38 is responsive to measuring roller 22 so that rotating cutter 36 is caused to selectively traverse ribbon 12. Cutting assembly 32 is positioned adjacent surface 26 so that only adhesive layer 18 is severed when rotating milling cutter 36 traverses ribbon 12. Consequently, after a predetermined length of ribbon 12 passes measuring roller 22, cutting assembly 32 is actuated to produce a separation 40 in the adhesive layer 18 carried on backing 16. It will be understood that creation of separation 40, which serves as a transition zone in adhesive layer 18 between successive adhesive strips, comprises a significant feature of the present invention.

Following the actuation of cutting assembly 32 to cause a separation 40 in the adhesive portion of ribbon 12, drive roller 20 is again actuated to advance ribbon 12 into guide portion 28. Preferably, when ribbon 12 is advanced to this station separation 40 will be positioned in the middle of the entrance to guide portion 28.

Activation assembly 42 is disposed immediately above positioning structure 24 and is mounted for reciprocal movement toward and away from the path of ribbon 12. Assembly 42 is responsive to measuring roller 22. In particular, activation assembly 42 comprises an elongate head 44 connected to cross member 46, which is actuated by double acting cylinder 48. Head 44 may be constructed of any suitable material, such as steel, molded rubber or aluminum, and preferably includes means for maintaining head 44 at an elevated temperature sufficient to activate adhesive 18. If desired, head 44 could include an ultrasonic source (not shown) to effect activation of the adhesive. Alternatively, an outside source of radiation or heat could be used. In accordance with the preferred construction, electrical resistance element 50 is provided within head 44. Electrical resistance element 50 is connected to a suitable source of electricity and raises the temperature across the face of head 44. Insulation 52 is provided between head 44 and cross member 46 to prevent undesirably high temperatures in components other than head 44.

A length or piece of material 54 on which it is desired to deposit a strip of adhesive 18 is placed between activation assembly 42 and positioning structure 24. Material 54 can comprise any suitable rigid, semi-rigid or flexible material, the exact composition of which is not critical to the practice of the invention. Material 54 can comprise, for example, metal, plastic or fabric. In particular, the side of material 54 on which the strip of adhesive 18 is desired, is positioned away from head 44. It will be understood that material 54 may comprise a continuous length thereof which is transported through apparatus 10 by any conventional means, for example, by spaced pairs of rollers (not shown). Moreover, it will be appreciated that material 54 can be transported between activation assembly 42 and positioning structure 24 at any preselected angle relative thereto so that the strips of adhesive 18 can be applied with precisely predetermined orientations.

With material 54 and a strip of adhesive 18 in the desired relative orientation, cylinder 48 actuates head 44 into engagement with the side of material 54 opposite the adhesive strip. Head 44, which is no wider than guide portion 28, moves down between grooves 30 to press material 54 and the underlying strip of adhesive 18 into engagement with structure 24. Simultaneously, sufficient energy is applied to activate the adhesive thereby causing the strip of adhesive 18 to adhere to material 54. Where ribbon 12 comprises a pressure sensitive adhesive, the pressure alone of head 44 may be sufficient to accomplish activation. It is noted that the contact face of head 44 preferably includes a layer of nonstick material, such as TEFLON, to discourage clinging between material 54 and activation assembly 42.

It will be understood that the provision of separation 40 in adhesive 18 provides a transition zone between the adhesive strip being activated and the next strip to be activated. Consequently, upon retraction of head 44 there is no taffy effect of stringy material pulling between activated and nonactivated zones. Thus, the provision of a substantial gap between successive strips of adhesive 18 whereby the ends of each strip remain well defined considerably increases the precision with which strips of adhesive 18 can be applied to material 54 by apparatus 10.

Following cycling of activation assembly 42, the advancement of material 54 simultaneously separates the deposited strip of adhesive 18 from backing 16 and repositions material 54 for the next application. Roller 20 advances the next strip of adhesive 18 into guide portion 28. Backing 16 simultaneously exits guide portion 28 passing over roller 56 and between idler roller 58 and driven roller 20. Therefore, as the next strip of adhesive 18 is drawn into position for deposition, the backing 16 which supported the previous strip is advanced past deflector plate 60 into scrap receptacle 62.

In sum, the operational sequence of apparatus 10 begins with the introduction of ribbon 12 between rollers 20 and 22. Drive roller 20 is responsive to measuring roller 22 to direct ribbon 12 along positioning structure 24. After each predetermined advancement, cutting assembly 32 is actuated to create separations 40 in adhesive layer 18 between successive strips of adhesive. Each strip of adhesive 18 is then advanced into guide portion 28 beneath material 54 so that separation 40 preferably coincides with the point of contact of one end of head 44. After cycling activation assembly 42, the material 54 and ribbon 12 are advanced to their next respective positions, as the separated backing 16 is collected.

Figure 2:
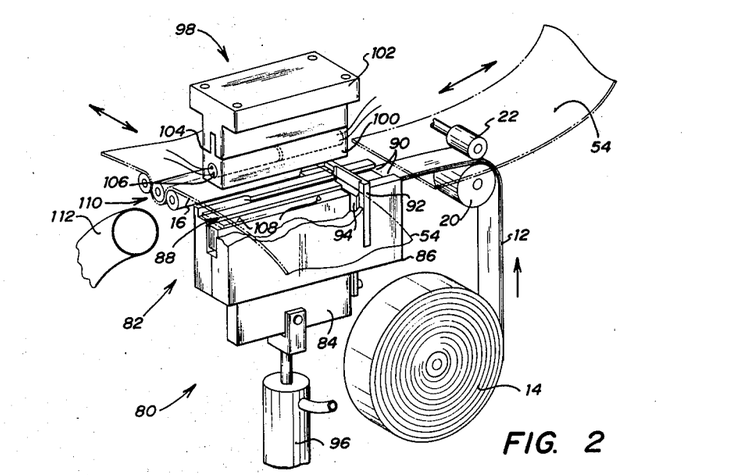
FIG. 2 is a diagrammatic illustration of a second embodiment of the invention in which certain parts have been broken away to illustrate more clearly certain features of the invention.

Referring now to FIG. 2, there is shown an apparatus for depositing adhesives 80 incorporating a second embodiment of the invention. As in the case of apparatus 10, adhesive ribbon 12 is directed into apparatus 80 from reel 14 between rollers 20 and 22. The ribbon 12 can comprise adhesive 18 with or without backing 16 on one side thereof. It will be understood that the presence of backing 16 is not critical to the operation of apparatus 80.

Drive roller 20 and measuring roller 22 direct ribbon 12 therebetween into engagement with positioning assembly 82. Positioning assembly 82 comprises a movable portion 84 within a stationary portion 86. The upper ends of movable portion 84 and stationary portion 86 define the guide portion 88 which functions to receive ribbon 12 prior to deposition. In particular, guide portion 88 can comprise opposed grooves 90, or other suitable structure. Ribbon 12 enters guide portion 88 passing over a first surface of stationary portion 86, between blades 92 and 94, and on into a position above movable portion 84. Blade 92 is rigidly attached to stationary portion 86, while blade 94 is attached to movable portion 84. The lower end of movable portion 84 is coupled to double acting cylinder 96, which is responsive to measuring roller 22. Cylinder 96 functions to selectively actuate the upper end of movable portion 84 into engagement with ribbon 12 stationed in positioning assembly 82.

Activation assembly 98 is substantially stationary and is located immediately above positioning assembly 82. Preferably, activation assembly 98 is mounted resiliently rather than fixedly to withstand the shock of contact with movable portion 84. In most other respects, activation assembly 98 is substantially similar to activation assembly 42. Assembly 98 comprises an elongate head 100, a cross member 102 and an insulative layer 104 therebetween. Head 100 can be maintained at an elevated temperature by electrical resistance element 106 located therein if adhesive 18 is thermally responsive. Head 100 is no wider than the interior edges of guide portion 88. Preferably, head 100 is narrower than guide portion 88 and ribbon 12 so that activation occurs only in the central area thereof to prevent clogging of guide portion 88 which would occur if the entire width of adhesive strip 18 were activated.

A length of material 54 is transported through apparatus 80 between activation assembly 98 and positioning assembly 82. The side of material 54 on which the adhesive is desired faces positioning assembly 82 and ribbon 12 therein. Material 54 may be directed through apparatus 80 by any suitable conventional means at any angle relative to positioning assembly 82 to achieve the desired orientation of the deposited adhesive.

When a predetermined length of adhesive ribbon 12 has been directed into positioning assembly 82, cylinder 96 actuates movable portion 84 upward toward activation assembly 98. Ribbon 12 is severed between blades 92 and 94 as movable portion 84 causes the resultant adhesive strip and material 54 to engage head 100 and thus effect deposition of the adhesive strip. Projections 108 are provided in the upper end of movable portion 84 to immobilize the forward portion of ribbon 12 during the shearing and lifting operation. After retraction of movable portion 84, material 54 and ribbon 12 are advanced. If desired, material 54 can be transported about rollers 110 to cause separation of any backing 16 from the deposited strip of adhesive formed from ribbon 12. In addition, suction tube 112 connected to a vacuum system (not shown) can be positioned adjacent rollers 110 to remove the separated strips of backing 16.

If desired, cutting assembly 32 described hereinbefore in conjunction with apparatus 10 could be utilized with apparatus 80 in place of blades 92 and 94. Thus, separations between successive adhesive strips 18 carried on backing 16 would be provided prior to actuation of movable portion 84.

In sum, the operational sequence of apparatus 80 begins with the advancement of a predetermined length of adhesive ribbon 12 into positioning assembly 82 by drive roller 20 and measuring roller 22. Movable portion 84 is actuated to simultaneously shear ribbon 12 between blades 92 and 94 and to press the sheared portion of ribbon 12 together with material 54 into engagement with head 100. The duration of engagement is sufficient to secure the adhesive to material 54, after which movable portion 84 retracts. Material 54 and ribbon 12 are then advanced to start the sequence once more.

Figure 3:
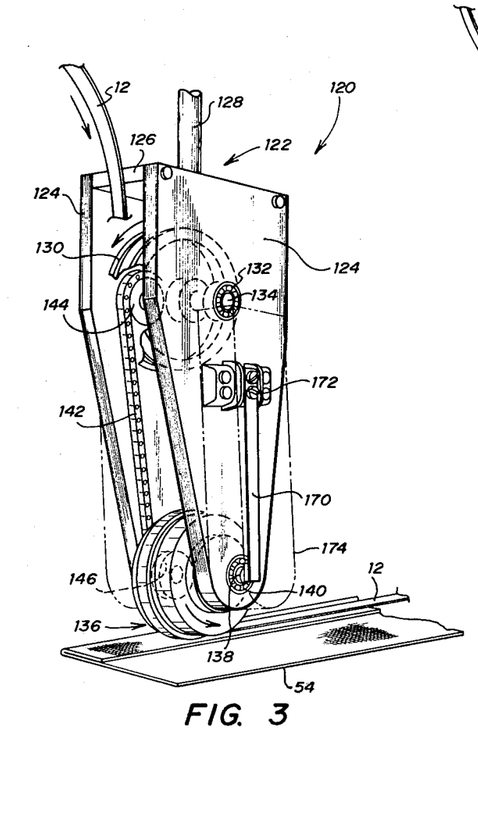
FIG. 3 is a diagrammatic illustration of a third embodiment of the invention in which certain parts have been broken away to illustrate more clearly certain features of the invention.

In reference now to FIG. 3, there is shown an apparatus for depositing adhesives 120 incorporating a third embodiment of the invention. Apparatus 120 includes steerable post structure 122 which comprises side plates 124 attached to cross member 126 carried by post 128. Post 128 is mounted for rotation about the vertical axis thereof in suitable support structure so that apparatus 120 can be steered to deposit an adhesive ribbon 12 in linear or curvilinear fashion on material 54.

Adhesive ribbon 12 is received within apparatus 120 and into engagement with drive pulley 130. Pulley 130 is mounted for rotation between side walls 124. Bearings 132 located in side walls 124 rotatively support shaft 134 on which drive pulley 130 is mounted. Pulley 130 can be driven by conventional means, such as a motor acting through a clutch/brake. Pulley 130 includes a peripheral groove in which the ribbon 12 is received and transported. The peripheral groove of pulley 130 may include, if desired, a coating of skid-resistant substance to prevent slippage of ribbon 12 during advancement. A measuring transducer (not shown) is connected to pulley 130 so that the precise length of ribbon 12 advanced thereby can be measured. Consequently, the quantity of ribbon 12 received and fed along a portion of the periphery of pulley 130 is simultaneously measured thereby.

Ribbon 12 is directed by pulley 130 toward engagement with wheel 136. Wheel 136 is mounted for rotation beneath pulley 130 and between the lower ends of side walls 124 in post structure 122. In particular, wheel 136 is mounted on shaft 138 which rotates in bearings 140 located in side walls 124. Pulley 130 and wheel 136 are drivingly connected. Endless chain 142 interconnects sprockets 144 and 146, which are attached to shafts 134 and 138, respectively. By this means, wheel 136 is caused to rotate in unison with pulley 130.

Figure 4:
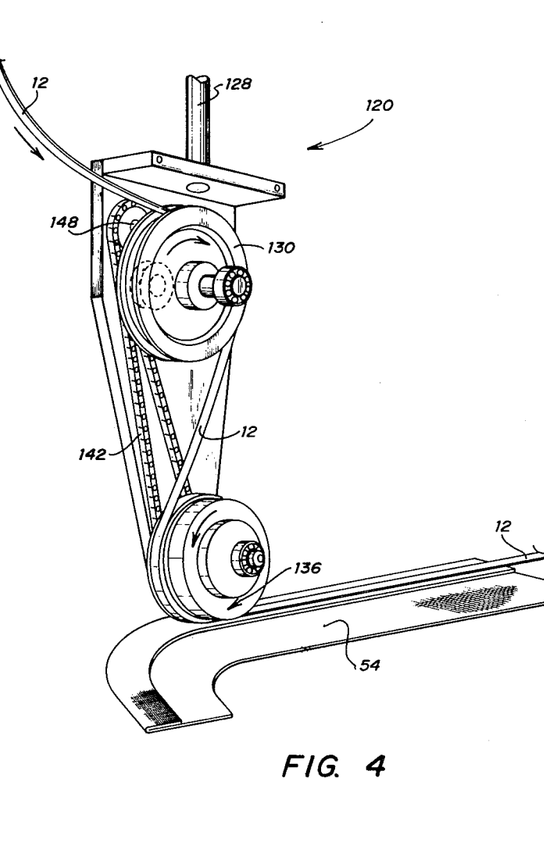
FIG. 4 is an illustration of a first modification of the apparatus of FIG. 3 in which certain parts have been broken away to illustrate more clearly certain features of the invention.

It will be appreciated that pulley 130 and wheel 136 can be caused to rotate in the same or opposite directions. As shown in FIG. 3, chain 142 and sprockets 144 and 146 drivingly connect pulley 130 and wheel 136 for rotation in the same direction. When directly interconnected in this manner, it will be appreciated that ribbon 12 contacts a relatively small peripheral portion of pulley 130. Pulley 130 can be caused to rotate in a direction opposite to the rotational direction of wheel 136 with the addition of idler sprocket 148 as shown in FIG. 4. The modification depicted in FIG. 4 allows a relatively longer segment of ribbon 12 to engage the periphery of pulley 130. It will be understood that either the interconnection of FIG. 3 or the modified interconnection of FIG. 4 can be utilized in apparatus 120.

Figure 8:
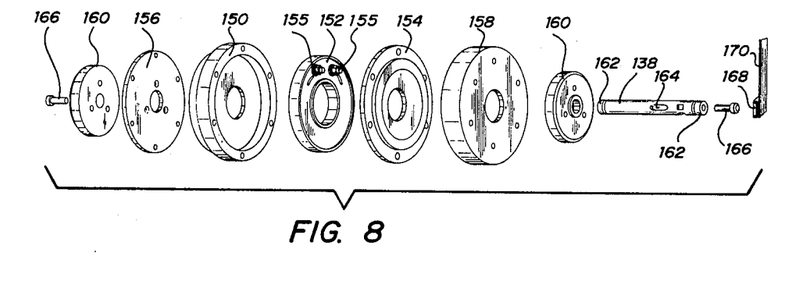
FIG. 8 is an exploded view illustrating the revolving heated wheel assembly of the third inventive embodiment.

With reference to FIG. 8 in conjunction with FIG. 3, wheel 136 includes an applicator portion 150 having a relatively thick periphery. Applicator portion 150 is constructed of any suitable material, such as aluminum. In accordance with the preferred construction, circular heating band 152 is secured within applicator portion 150 by clamp ring 154. Heating band 152 encloses an electrical resistance element by which the periphery of applicator portion 150 is maintained at an elevated temperature sufficient to activate adhesive ribbon 12. Heating band 152 includes terminals 155 for connecting the resistance element therein with a suitable source of electricity. Applicator portion 150, heating band 152 and clamp ring 154 are sandwiched between insulator plate 156 and insulator disc 158. Plate 156 and disc 158 are comprised of suitable insulative material and are provided to prevent undesirably high temperatures in components away from applicator portion 150. Plate 156 and disc 158 in turn are secured between hubs 160 which are mounted on shaft 138. Insulator bushings 162 are included at each end of hollow shaft 138. An opening 164 positioned along shaft 138 permits passage of wires connecting heating band terminals 155 and brush contacts 166 mounted in bushings 162. Wheel 136 rotates in bearings 140 with brush contacts 166 engaging brushes 168. Each brush 168 is carried by spring arm 170 attached to an insulator block 172 mounted on side wall 124. It will be apparent that connection of spring arms 170 to a suitable power source provides the electricity which causes applicator portion 150 to be heated by heating band 152. Covers 174 are provided on both side walls 124 to prevent accidental contact with electrical conductors. If desired, an ultrasonic source could be located inside or attached to wheel 136 for activation of ribbon 12.

Referring again to FIG. 3, ribbon 12 is received by wheel 136 and directed into engagement with material 54. If wheel 136 is heated or ultrasonically vibrated, adhesive ribbon 12 becomes activated during transportation on a portion of the periphery of wheel 136. During this time interval, wheel 136 applies sufficient energy to the adhesive of ribbon 12 to effect activation thereof. Simultaneously, wheel 136 presses the now activated adhesive of ribbon 12 into engagement with the underlying material 54. Alternatively, an outside source of radiation or heat could be used to activate the adhesive during engagement with material 54. In this manner, a strip of adhesive ribbon 12 can be applied to material 54 prior to subsequent fabrication operations. Selective rotation of post structure 122 relative to material 54 permits the application of adhesive ribbon 12 thereto along straight or curved paths.

Figure 5:
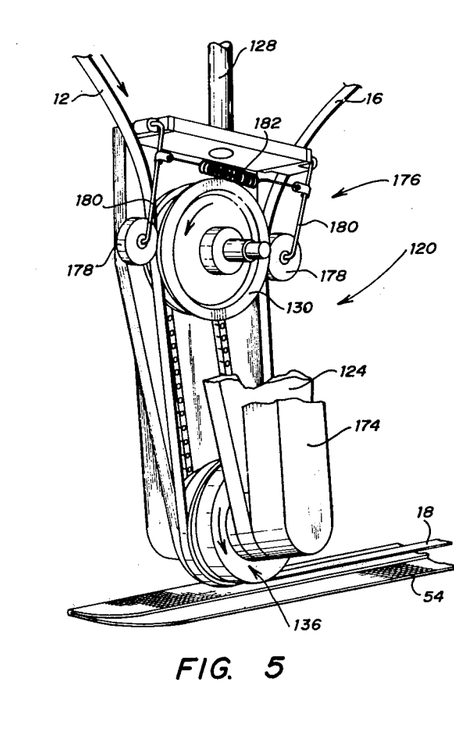
FIG. 5 is an illustration of a second modification of the apparatus of FIG. 3 in which certain parts have been broken away to illustrate more clearly certain features of the invention.

With reference to FIG. 5 in conjunction with FIG. 3, there is shown a retainer assembly 176 which can be utilized with apparatus 120. Retainer assembly 176 is particularly useful when ribbon 12 comprises a backing 16 coated on one side with a layer of adhesive 18. Retainer assembly 176 comprises a pair of rollers 178 which engage pulley 130 therebetween. Each roller 178 is rotatively carried by an arm 180 pivotally connected to post structure 122. Spring 182 interconnects arms 180 to urge rollers 178 against pulley 130. Ribbon 12 is fed between first roller 178 and pulley 130 so that backing 16 contacts wheel 136. As the adhesive 18 is deposited, backing 16 continues around wheel 136 and is drawn upward between pulley 130 and second roller 178 for collection. It is noted that since pulley 130 and wheel 136 are drivingly interconnected, backing 16 is not required for the operation of retainer assembly 176. If desired, retainer assembly 176 can be utilized in the absence of backing 16 on ribbon 12.

Figure 6:
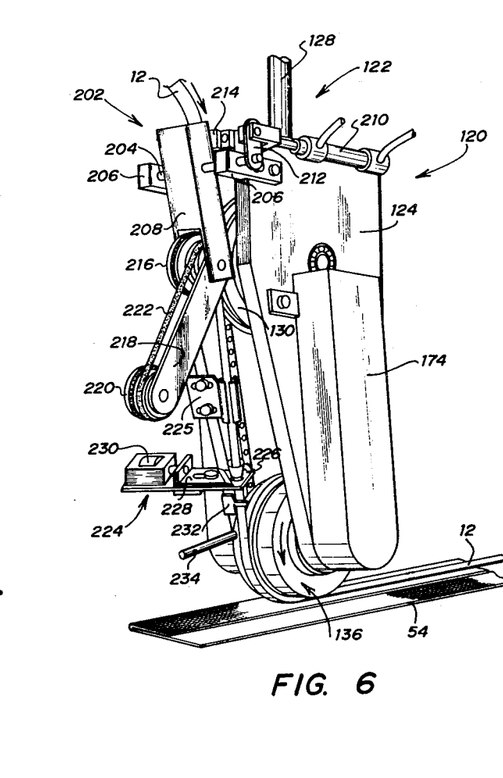
FIG. 6 is an illustration of a third modification of the apparatus of FIG. 3.

Referring now to FIG. 6, there is shown another modification of the apparatus for depositing adhesives 120. Apparatus 120 can be utilized with start/stop assembly 202 and cutting assembly 224 for increased capability.

Start/stop assembly 202 is positioned adjacent pulley 130 on post structure 122. Assembly 202 includes a rod 204 rotatably supported in extensions 206. Extensions 206 project in spaced parallel relationship from side walls 124. Adhesive ribbon 12 enters apparatus 120 adjacent member 208 which is mounted on rod 204 between extensions 206. Double acting cylinder 210 is coupled to crank arm 212 attached to rod 204 and is responsive to measuring pulley 130. It will thus be apparent that actuation of cylinder 210 causes member 208 to rotate about the horizontal axis of rod 204.

Stop/start assembly 202 further includes stop 214 mounted on structure 122 adjacent the upper end of member 208. Roller 216 is mounted for rotation in the lower end of member 208 and adjacent pulley 130. If desired, stop/start assembly 202 can include arm 218, which, for clarity, is shown in a position pivoted away from the path of ribbon 12. Arm 218 is pivotally attached to the lower end of member 208 and includes rotatably mounted roller 220 at the lower end thereof. Endless belt 222 drivingly connects rollers 216 and 220 for rotation in unison. It will thus be apparent that optional arm 218 together with roller 220 and belt 222 can be positioned so as to provide additional support for ribbon 12 between pulley 130 and wheel 136.

As ribbon 12 proceeds toward wheel 136, it is guided into cutting assembly 224 by guide 225. Guide 225 is adjustably mounted for displacement so that ribbon 12 can be precisely guided into cutting assembly 224. Cutting assembly 224 comprises a plate 226 extending across the path of ribbon 12 and having an aperture therein for ribbon 12 to pass therethrough. Movable blade 228 actuated by solenoid 230 is slidably mounted on plate 226. Solenoid 230 is connected to a conventional source of power and is responsive to measuring pulley 130 to selectively extend blade 228 shearing ribbon 12. Preferably, finger 232 is located beneath cutting assembly 224 to prevent the severed end of ribbon 12 from falling away from wheel 136. If desired, an air jet 234 can be positioned beneath cutting assembly 224 to better maintain the end of ribbon 12 in contact with wheel 136.

The operational sequence of modified apparatus 120 begins with the receipt of ribbon 12 between stop/start assembly 202 and pulley 130. Ribbon 12 passes between the upper end of member 208 and stop 214 into engagement with pulley 130. Roller 216 maintains positive nonslip engagement between ribbon 12 and pulley 130, after which ribbon 12 is advanced toward guide 225 by roller 220. Guide 225 aligns ribbon 12 for passage through cutting assembly 224, then around the periphery of wheel 136 and into engagement with material 54.

When a predetermined length of ribbon 12 has been advanced, cylinder 210 functions to pivot rod 204. Member 208 pivots with rod 204 to block ribbon 12 against stop 214, while simultaneously disengaging roller 216 from pulley 130. It will be apparent that the blockage of ribbon 12 together with the simultaneous disengagement of the feed means instantaneously halts the transport of adhesive ribbon 12. Thus, ribbon 12 stops precisely, eliminating the carry-through effect resulting from the inertias of pulley 130 and wheel 136. With ribbon 12 halted, solenoid 230 cycles to shear ribbon 12 in cutting assembly 224. The remainder of the previous strip of adhesive ribbon 12 is applied to material 54 by wheel 136, and cylinder 210 is actuated in reverse to start the feeding and deposition of the next adhesive strip to be cut from ribbon 12. It will thus be apparent that assemblies 202 and 224 provide for the precise stopping, cutting and starting of ribbon 12 by apparatus 120 to deposit adhesive strips having predetermined length in straight or curved fashion on material 54.

Figure 7:
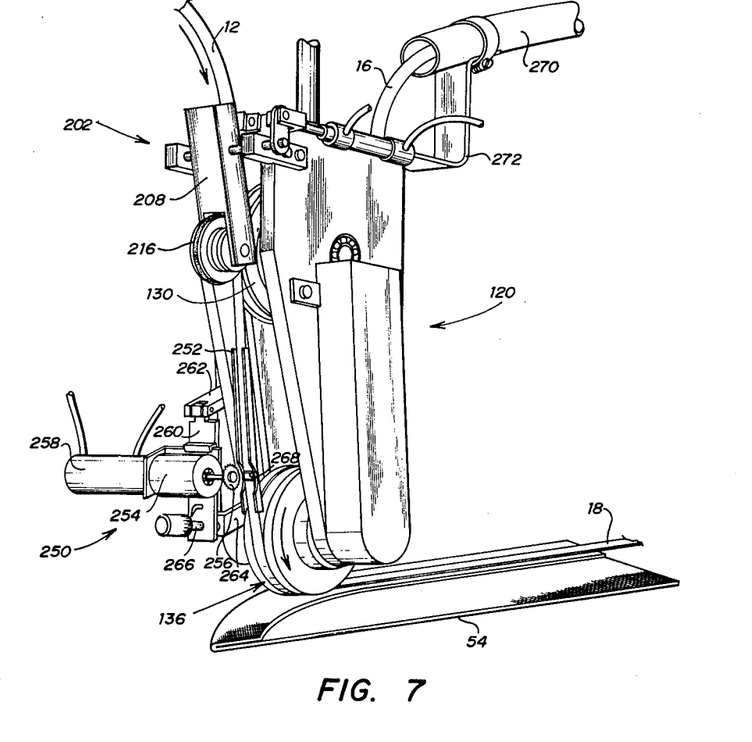
FIG. 7 is an illustration of a fourth modification of the apparatus of FIG. 3.

Referring now to FIG. 7 in conjunction with FIG. 6, there is shown an alternative cutting assembly 250 which can be utilized with apparatus 120 to apply ribbon 12 comprising backing 16 coated on one side with a layer of adhesive 18. Stop/start assembly 202 is shown without optional arm 218, roller 220 and endless belt 222 since backing 16 is simultaneously drawn from wheel 136 as ribbon 12 is fed by pulley 130.

Cutting assembly 250 is positioned adjacent the path of ribbon 12 between pulley 130 and wheel 136. Assembly 250 includes support channel 252 which transports ribbon 12 past electric motor 254 driving a small milling cutter 256. Motor 254 is mounted for movement toward and away from the path of ribbon 12, and is actuated by double acting cylinder 258. Double acting cylinder 258 is responsive to measuring pulley 130 to cause milling cutter 256 to traverse the path of ribbon 12. Cutting assembly 250 is positioned adjacent channel 252 so that only adhesive layer 18 is severed when rotating cutter 256 crosses ribbon 12. In particular, cross member 260 is pivotally attached to upper extension 262, which is secured to side wall 124 according to the preferred construction of the invention. The other end of cross member 260 is adjustably attached to lower extension 264 with, for example, thumbscrew 266. Thumbscrew 266 thus allows cutting assembly 250 to be adjusted to produce separation 268 in adhesive layer 18 only, without severing backing 16. Consequently, after a predetermined length of ribbon 12 is advanced, cutting assembly 250 functions to produce a separation 268 in adhesive layer 18, serving as a transition zone between the ends of successive strips of adhesive 18, whereby the ends of each strip remain well defined during engagement between wheel 136 and material 54.

It will be understood that separation 268 in adhesive layer 18 comprises a significant feature due to the elimination of the taffy effect of stringy material pulling between activated and nonactivated adhesive zones. In addition, the provision of substantial gaps in adhesive layer 18, permits modified apparatus 120 to negotiate sharper turns without disturbing the adjacent ends of successively deposited strips of adhesive.

After the deposition of predetermined strips of adhesive 18, backing 16 continues around wheel 136 drawn by pulley 130 upwardly for collection. A suction tube 270 connected to a vacuum system (not shown) can be positioned on a bracket 272 attached to post structure 122 to collect the separated backing 16.

From the foregoing, it will be understood that the present invention comprises an apparatus for depositing adhesives which incorporates numerous advantages over the prior art. Thus, by means of the invention, preselected lengths of adhesive can be applied in a desired orientation on a length or piece of material prior to subsequent fabrication steps. One of the advantages deriving from the use of the invention involves the elimination of many heretofore prerequisite manual trimming and positioning operations associated with the use of adhesives as a replacement for conventional connection techniques in various operations. Other advantages will be apparent to those skilled in the art.

Although particular embodiments of the invention have been illustrated in the accompanying Drawings and described in the foregoing Detailed Description, it will be understood that the invention is not limited to the embodiments disclosed, but is capable of numerous rearrangements, modifications, and substitutions of steps and elements without departing from the spirit and scope of the invention.

What is claimed is:

1. Apparatus for depositing adhesive strips on a length or piece of material, which comprises:

means for directing a ribbon including a layer of activatable adhesive along a predetermined input path;

means for measuring a length of ribbon directed along the input path;

said directing means being responsive to the measuring means to advance predetermined lengths of ribbon along the input path;

cutter means located along the input path beyond the directing means and responsive to the measuring means for separating at least the adhesive layer of the ribbon to provide adhesive strips having predetermined lengths;

means located along the input path beyond the cutter means having a stationary portion defining a guide surface having a slot formed therethrough and structure extending from opposite edges of the guide surface to define opposed grooves for positioning the ribbon adjacent the material onto which the adhesive is to be deposited;

means located along the input path having a movable portion movable between retracted and extended positions, the movable portion in the extended position extending through the slot in the stationary portion for selectively engaging the adhesive ribbon and the material to deposit the strip of adhesive onto the material responsive to the measuring means;

means for activating the adhesive during engagement between the ribbon material to attach the adhesive strip to the material; and wherein the cutter means comprises fixed and movable knife blades disposed on opposite sides of the input path, said movable blade being actuated concurrently with the engaging means to shear the adhesive ribbon.

2. Apparatus for depositing adhesive strips having a predetermined length on a length or piece of material, which comprises:

a driven roller for advancing a ribbon including a layer of energy responsive adhesive along a predetermined input path;

an idler roller in engagement with the driven roller for measuring the predetermined length of ribbon advanced therebetween along the input path;

said driven roller being responsive to the measuring idler roller to advance the predetermined length of ribbon along the input path;

structure located along the input path for positioning the adhesive ribbon adjacent the side of material on which adhesive strips are to be deposited;

cutting means responsive to the measuring idler roller and located along the input path prior to the positioning means for selectively separating at least a portion of the ribbon to form strips of adhesive;

head means located adjacent the ribbon path and responsive to the measuring idler roller for selectively engaging each strip of adhesive, the material and at least a portion of the positioning means and for providing energy to the adhesive to effect deposition of the adhesive strip onto the material; and wherein the head means is substantially stationary and the positioning structure includes a movable portion mounted for displacement within a stationary portion for movement from a retracted position to an extended position to selectively press the adhesive strip and the material against the head means in response to the measuring of a predetermined length of the ribbon by the idler roller, said stationary portion defining a quide surface thereon and having structure extending upward from the guide surface from opposite edges thereof and extending along the input path to define opposed grooves, the guide surface having a slot formed therein for passage of the movable portion therethrough, the movable portion having a quide surface coplaner with the guide surface of the stationary portion when the movable portion is in the retracted position, the guide surfaces and grooves positioning the adhesive ribbon.

3. The apparatus of claim 2 wherein the cutting means comprises a fixed blade secured to the stationary portion of the positioning structure and a movable blade secured to the movable portion of the positioning structure, whereby the adhesive ribbon is sheared as the adhesive strip and material are pressed against the head means.

4. Apparatus for depositing adhesive strips having a predetermined length on a length or piece of material, which comprises:

a driven roller for advancing a ribbon including a layer of energy responsive adhesive along a predetermined input path;

an idler roller in engagement with the driven roller for measuring the predetermined length of ribbon advanced therebetween along the input path;

said driven roller being responsive to the measuring idler roller to advance the predetermined length of ribbon along the input path;

structure located along the input path for positioning the adhesive ribbon adjacent the side of material on which adhesive strips are to be deposited;

cutting means responsive to the measuring idler roller and located along the input path prior to the positioning means for selectively separating at least a portion of the ribbon to form strips of adhesive;

head means located adjacent the ribbon path and responsive to the measuring idler roller for selectively engaging each strip of adhesive, the material and at least a portion of the positioning means and for providing energy to the adhesive to effect deposition of the adhesive strip onto the material;

a plurality of rollers around which the material is advanced following deposition of the adhesive strips;

vacuum means adjacent said rollers for receiving any backing dislodged from said deposited adhesive strips by advancement around said rollers; and wherein the head means is substantially stationary and the positioning structure includes a movable portion mounted for displacement within a stationary portion to selectively press the adhesive strip and the material against the head means in response to the measuring of a predetermined length of the ribbon by the idler roller, the cutting means comprising a fixed blade secured to the stationary portion of the positioning structure and a movable blade secured to the movable portion of the positioning structure, whereby the adhesive ribbon is sheared as the adhesive strip and fabric are pressed against the head means.

5. An applicator for depositing adhesive on a piece of material, comprising:

first and second juxtaposed positioning members;

advancement means guiding and advancing a predetermined length of an adhesive bearing ribbon between said positioning members; and an engagement member movably guided within said first positioning member for reciprocation therein toward and away from said second positioning member, said engagement member having a retracted position permitting advancement of said ribbon and said material and assisting the guidance of the adhesive bearing ribbon into the space between said positioning members and moving into an extended position engaging said ribbon, said material and said second positioning member with an engaging surface to effect deposition of adhesive on said material in response to said advancement means advancing the predetermined length of ribbon between said positioning members, the engaging surface of said engagement member in the retracted position, and said first positioning member defining in combination a guide for guiding said ribbon prior to said deposition, said first positioning member having guide portions on either side of the engaging surface in the retracted position to guide said ribbon along the engaging surface.

6. An applicator for depositing adhesive on a piece of material, comprising:

first and second juxtaposed positioning members;

advancement means guiding and advancing a predetermined length of an adhesive bearing ribbon between said positioning members; and an engagement member movably guided within said first positioning member for reciprocation therein toward and away from said second positioning member, said engagement member having a retracted position permitting advancement of said ribbon and said material into the space between said positioning members and moving into an extended position engaging said ribbon, said material and said second positioning member to effect deposition of adhesive on said material in response to said advancement means advancing the predetermined length of ribbon between said positioning members, said engagement member in said retracted position and said first positioning member defining in combination a guide for receiving said ribbon prior to said deposition, said guide comprising opposed grooves formed in said first positioning member spanned by an end surface of said engagement member extending therebetween.

7. The invention according to claim 6 wherein said second positioning member is substantially stationary but resiliently mounted to withstand impact shock from said engagement member.

8. The invention according to claim 6 wherein said engagement member has projections in an end surface facing said second positioning member to immobilize said ribbon.

9. An applicator for depositing adhesive on a piece of material, comprising:

first and second juxtaposed positioning members;

advancement means guiding and advancing a predetermined length of adhesive bearing ribbon between said positioning members; and an engagement member movably guided within said first positioning member for reciprocation therein toward and away from said second positioning member, said engagement member having a retracted position permitting advancement of said ribbon and said material into the space between said positioning members and moving into an extended position and engaging said ribbon, said material and said second positioning member to effect deposition of adhesive on said material in response to said advancement means advancing the predetermined length of ribbon between said positioning members, said engagement member in said retracted position and said first positioning member defining in combination a guide for receiving said ribbon prior to said deposition, said guide having interior edges spaced laterally across said ribbon and wherein said second positioning member has a head portion facing said first positioning member, which head portion has a width less than said lateral spacing of said interior edges of said guide.

10. The invention according to claim 9 wherein said adhesive is thermally activated and wherein said head portion of said second positioning member includes heating means for activating said adhesive, whereby activation of adhesive occurs only in the central area of said ribbon to prevent clogging of said guide.

11. An applicator for depositing adhesive on a piece of material, comprising:

a pair of engagable juxtaposed deposition members;

advancement means for measuring, guiding and advancing a predetermined length of an adhesive bearing ribbon between said deposition members;

guide means associated with one of said deposition members receiving and guiding said ribbon into facing relationship with the other of said deposition members, portions of said guide means extending over the edges of said ribbon facing the other of said deposition members such that the central section of said ribbon is exposed to said other deposition member and the edges of said ribbon are protected by said guide means against engagement with said other deposition member, such that upon engaging of said deposition members in response to the advancement of the predetermined length of ribbon between said deposition members with said material and said ribbon therebetween, edge adhesive deposition from said ribbon onto said guide means is eliminated.

12. The invention according to claim 11 wherein the other of said deposition members has an engagement head narrower than said guide means to prevent clogging of the latter upon adhesive deposition.

* * * * *

UNITED STATES PATENT AND TRADEMARK OFFICE
CERTIFICATE OF CORRECTION

PATENT NO. : 4,328,062
DATED : May 4, 1982
INVENTOR(S) : JOSEPH W. A. OFF, et al.

It is certified that error appears in the above—identified patent and that said Letters Patent is hereby corrected as shown below:

Column 2, line 4 "on" should be --onto--;

Column 12, line 2, "quide" should be --guide--;

Column 12, line 8, "quide" should be --guide--.

Signed and Sealed this

Fifth Day of October 1982

[SEAL]

Attest:

GERALD J. MOSSINGHOFF

Attesting Officer  Commissioner of Patents and Trademarks